(12) United States Patent
Shurtleff et al.

(10) Patent No.: US 9,807,173 B2
(45) Date of Patent: Oct. 31, 2017

(54) NOTIFICATION SYSTEM FOR PERSONAL AND SHARED DEVICES

(71) Applicant: Cisco Technology, Inc., San Jose, CA (US)

(72) Inventors: Mark Shurtleff, Oakland, CA (US); Wenhui Yu, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 333 days.

(21) Appl. No.: 14/669,007

(22) Filed: Mar. 26, 2015

(65) Prior Publication Data

US 2016/0285974 A1    Sep. 29, 2016

(51) Int. Cl.
| | | |
|---|---|---|
| *G06F 15/16* | (2006.01) | |
| *G06F 15/177* | (2006.01) | |
| *H04L 29/08* | (2006.01) | |
| *H04L 12/28* | (2006.01) | |

(52) U.S. Cl.
CPC .......... *H04L 67/12* (2013.01); *H04L 12/2829* (2013.01); *H04L 67/24* (2013.01); *H04L 67/306* (2013.01)

(58) Field of Classification Search
CPC ..... H04L 67/12; H04L 12/2829; H04L 67/24; H04L 67/36
USPC ........................................................ 709/206
See application file for complete search history.

(56) References Cited

U.S. PATENT DOCUMENTS

| | | | |
|---|---|---|---|
| 6,816,878 B1 | 11/2004 | Zimmers et al. | |
| 7,054,654 B1 | 5/2006 | Sladek et al. | |
| 8,640,021 B2 | 1/2014 | Perez et al. | |
| 2006/0123053 A1 | 6/2006 | Scannell, Jr. | |
| 2011/0078161 A1* | 3/2011 | Tran .................. | G06F 17/30053 707/752 |
| 2012/0063649 A1* | 3/2012 | Pettit ................. | G06F 17/30029 382/118 |
| 2014/0379801 A1* | 12/2014 | Gupta .................. | H04L 67/306 709/204 |
| 2016/0173293 A1* | 6/2016 | Kennedy ............. | H04L 12/2814 709/222 |

OTHER PUBLICATIONS

Bazinette, Vincent; An Intelligent Notification System (2001), IBM Research Report—16 pages.

(Continued)

*Primary Examiner* — Phuoc Nguyen
*Assistant Examiner* — Kishin G Belani
(74) *Attorney, Agent, or Firm* — Samuel M. Katz

(57) ABSTRACT

In one embodiment, a method includes: determining that a notification is to be transmitted to at least one shared device of a household, the shared device comprising a display screen and being shared by a plurality of members of the household; identifying a plurality of personal devices currently located in the household, each of the plurality of personal devices belonging to a single member of the household; selecting a notification format to use for the notification, the selected notification format corresponding to a highest priority user profile associated with a personal device from the identified plurality of personal devices currently located in said household; and transmitting the notification in the selected notification format to the at least one shared device for display.

15 Claims, 9 Drawing Sheets

(56) References Cited

OTHER PUBLICATIONS

Cross Point Industries; Voice Alert Systems 5 Wireless Annunciator (2003) can be seen at: https://www.netatmo.com.
Fico; Can Fraud Alerts Raise Customer Loyalty? (2012) Can be seen at: http://bankinganalyticsblog.fico.com/2012/12/can-fraud-alerts-raise-customer-loyalty.html.
Netatmo Weather Station; Netatmo (2014) Can be seen at: https://www.netatmo.com.
Simplyhome System; Simplyhome (2014) Can be seen at: http://www.simply-home.com/HowItWorks.html.
Wu, Winston H.; Medic Medical Embedded Device for Individualized Care, Artificial Intelligence in Medicine (2008) 42, 137-152.

* cited by examiner

HOUSEHOLD 100

TOM'S USER PROFILE 101
- User identifier: Tom
- User type: parent
- Rank: 1

TOM'S CELL PHONE 120A PROFILE
- Device identifier: Tom's cell phone
- Type: personal
- Location: GPS coordinates
- Associated user profile(s): Tom's user profile 101

TOM'S TABLET 140A PROFILE
- Device identifier: Tom's tablet computer
- Type: personal
- Location: GPS coordinates
- Associated user profile(s): Tom's user profile 101

ANGELA'S USER PROFILE 102
- User identifier: Angela
- User type: parent
- Rank: 2

ANGELA'S CELL PHONE 120B PROFILE
- Device identifier: Angela's cell phone
- Type: personal
- Location: GPS coordinates
- Associated user profile(s): Angela's user profile 102

EMILY'S USER PROFILE 104
- User identifier: Emily
- User type: grade school
- Rank: 4

EMILY'S CELL PHONE 120D PROFILE
- Device identifier: Emily's cell phone
- Type: personal
- Location: GPS coordinates
- Associated user profile(s): Emily's user profile 104; Angela's user profile 102

FOSTER'S USER PROFILE 103
- User identifier: Foster
- User type: teenager
- Rank: 3

FOSTER'S CELL PHONE 120C PROFILE
- Device identifier: Foster's cell phone
- Type: personal
- Location: GPS coordinates
- Associated user profile(s): Angela's user profile 103; Tom's user profile 101

AMY'S USER PROFILE 105
- User identifier: Amy
- User type: pre-school
- Rank: 5

AMY'S TABLET 140B PROFILE
- Device identifier: Amy's tablet computer
- Type: personal
- Location: GPS coordinates
- Associated user profile(s): Amy's user profile 105; Tom's user profile 101

TELEVISION 140A PROFILE
- Device identifier: Living room TV
- Type: shared

TELEVISION 140B PROFILE
- Device identifier: Bedroom TV
- Type: shared

NOTIFICATION FORMATS 106
- Format(#1)-User_type(#Parent)
- Format(#2)-User_type(#Teenager)
- Format(#3)-User_type(#Grade_School)
- Format(#4)-User_type(#Pre_School)

FIG. 3

NOTIFICATION SYSTEM FOR PERSONAL AND SHARED DEVICES

TECHNICAL FIELD

The present disclosure generally relates to methods and apparatus to select a format for a notification to transmit to personal and shared devices.

BACKGROUND

A variety of alert notification systems are available for providing different types of alerts, such as police, fire or emergency alerts to the public. Typically, the alert notification is generated from a public authority and is targeted to the public residing within an affected geographic area. The mechanism for providing alert notification can range from warning sirens to warning tones or announcements broadcast over radio and television. For example, the National Weather Service can promulgate tones or announcements over radio and television to convey weather forecasts, warnings and "watches" (i.e., warnings associated with observed weather conditions).

In recent years, the emergence of "Internet of Things" (IoT) devices and IoT networks enabled the alerting systems to be applied to a wider range of applications such as home appliance monitoring, health monitoring, etc. In such systems, different sensors are operable to monitor different parameters, such as a device state or an environmental measure, and report these data to an IoT server. When certain conditions are met, an alert message, usually consisting of a textual message, may be sent from the IoT server to one or more IoT devices belonging to an end user.

BRIEF DESCRIPTION OF THE DRAWINGS

The present invention will be understood and appreciated more fully from the following detailed description, taken in conjunction with the drawings in which:

FIG. 3 is a simplified block diagram illustration of users and devices profiles of a particular household, constructed and operative in accordance with an embodiment of the present invention;

DESCRIPTION OF EXAMPLE EMBODIMENTS

Overview

In one embodiment, a method includes: determining that a notification is to be transmitted to at least one shared device of a household, the shared device comprising a display screen and being shared by a plurality of members of the household; identifying a plurality of personal devices currently located in the household, each of the plurality of personal devices belonging to a single member of the household; selecting a notification format to use for the notification, the selected notification format corresponding to a highest priority user profile associated with a personal device from the identified plurality of personal devices currently located in said household; and transmitting the notification in the selected notification format to the at least one shared device for display.

Detailed Description of Example Embodiments

Figure 1:
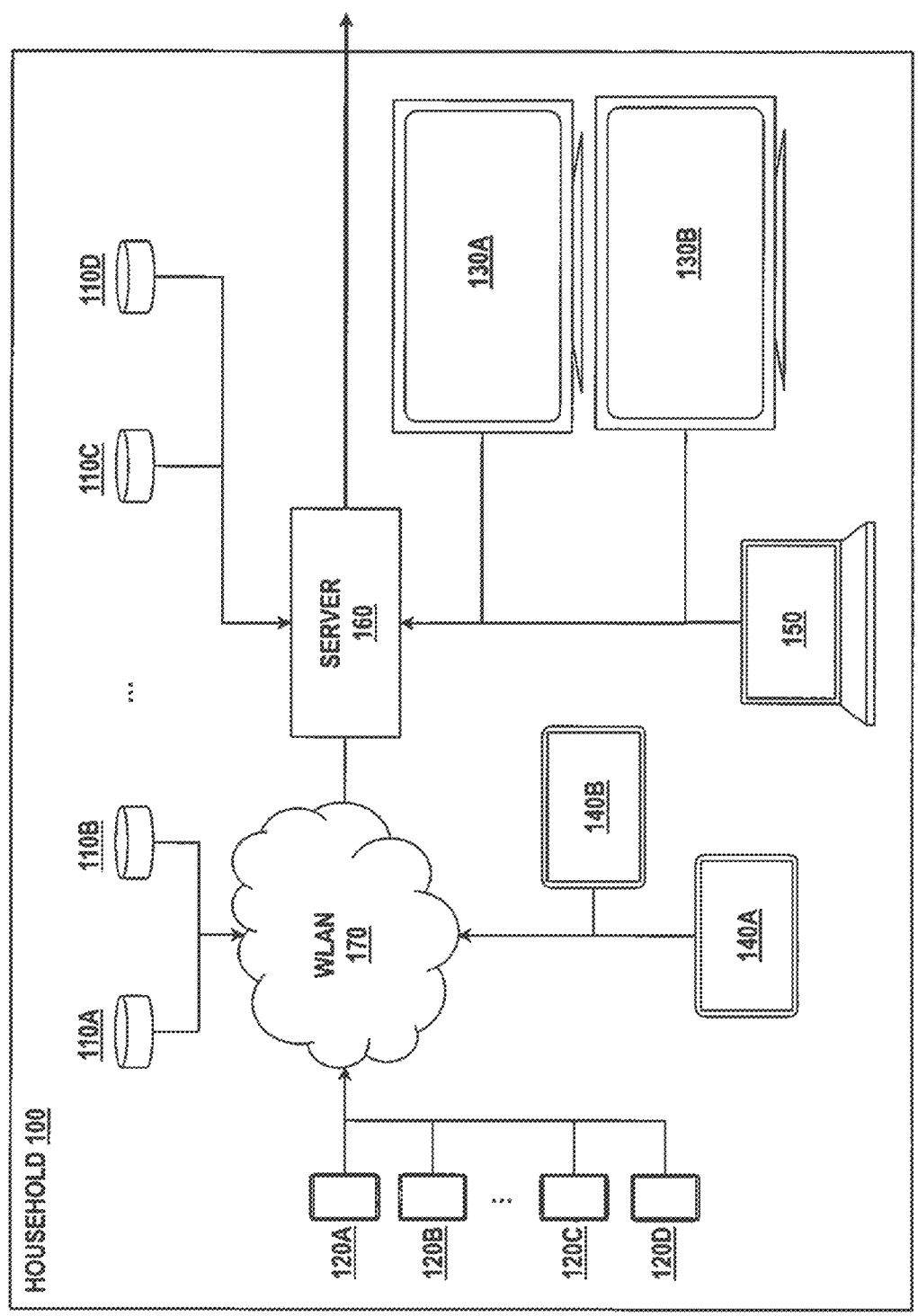
FIG. 1 is a simplified block diagram illustration of a home network architecture, constructed and operative in accordance with an embodiment of the present invention.

Reference is now made to FIG. 1, which is a block diagram illustration of a home network architecture, constructed and operative in accordance with an embodiment of the present invention.

FIG. 1 shows a home network architecture located in a household 100. The home network comprises a plurality of devices which communicate with a server 160. A device is used to refer to an electronic device (e.g., an appliance, a sensor, etc.) with a particular set of device attributes (e.g., a cooling or heating function, an environmental monitoring or recording function, a light-emitting function, a sound-emitting function, heart monitoring function, blood pressure monitoring function, etc.) that can be embedded with and/or controlled/monitored by a central processing unit (CPU), microprocessor, application specific integrated circuit (ASIC), or the like, and configured for connection to the home network such as, for example, the Internet. For example, devices may include, but are not limited to, refrigerators, ovens, dishwashers, clothes washers, air conditioners, thermostats, light fixtures, electricity meters, gas meters, etc., so long as the devices are equipped with a communications interface for communicating with the home network. Devices may also include cell phones, desktop computers, laptop computers, tablet computers, personal digital assistants (PDAs), watches, televisions, etc. Accordingly, the home network may be comprised of a combination of "legacy" Internet-accessible devices (e.g., laptop or desktop computers, cell phones, etc.) in addition to devices that do not typically have Internet-connectivity (e.g., dishwashers, etc.). For the sake of simplicity of depiction only, a plurality of sensors 110A to 110D that may be connected to a device, or not, are shown in FIG. 1. Similarly, a plurality of devices equipped with a display screen is shown in FIG. 1. These devices equipped with a display screen may include, but are not limited to, a plurality of cell phones 120A to 120D, televisions and/or set-top boxes (STBs) 130A and 130B, tablet computers 140A and 140B and a laptop or personal computer (PC) 150.

A server 160 is also provided and operable to communicate with a first set of devices 110A-110D (hereinafter referred as sensors) and a second set of devices 120A-120D, 130A, 130B, 140A, 140B and 150 (hereinafter referred as devices equipped with a display screen). The sensors 110A-110D are configured to communicate with the server 160 over a physical communications interface or layer, shown in FIG. 1 as a wireless connection (WLAN) for sensor 110A and 110B or a direct wired connection for sensors 110C and 110D. The wireless interface may, for example, comply with a wireless internet protocol (IP), such as IEEE 802.11. Although FIG. 1 illustrates sensors 110A and 110B communicating with the server 160 wirelessly and sensors 110C and 110D communicating with the server 160 over a wired connection, those skilled in the art will appreciate that each of the sensors 110A to 110D may communicate with the server 160 over a wired and/or wireless connection. Similarly, the cell phones 120A to 120D, the televisions and/or STBs 130A-130B, the PC or laptop computer 150 and the tablet computers 140A-140B are configured to communicate with the server 160 over a wired or wireless connection as it is well known in the art. Alternatively and/or additionally, some of the devices of the home network may be configured with a communication interface independent of the wired and wireless connections. For example, of the wireless interface corresponds to a WiFi interface, some of the devices of the home network may have Bluetooth or NFC (Near Field Communication) interfaces for communicating directly with each other and/or other Bluetooth or NFC-enabled devices.

The server 160 may be located in the household and provided as a standalone device or embedded in one physical device of the household 100. For example, the server 160 may be embedded into a wireless access point, a home gateway, a PC, laptop computer, etc. Alternatively, in a cloud computing environment, the server 160 may be provided as a remote server located outside of the household 100. In such a situation, the home network may be configured as an "Internet of Things" network (IoT) where different IoT devices such as for example, but not limited, the sensors 110A-110D and/or the cell phones 120A to 120D, the televisions and/or STBs 130A-130B, the PC or laptop computer 150 and the tablet computers 140A-140B are configured to communicate with the server 160 (IoT server) via the Internet. In any case, the server 160 is operable to receive measures corresponding to parameters monitored by the sensors 110A to 110D (e.g. environmental parameters such as dust level in a bedroom, carbon dioxide level in the kitchen, or health parameters such as heart rate, blood pressure level, etc.) or any other devices operable to communicate and generate and/or transmit notifications to inform the different users of the household 100 that a current measure is over a predefined threshold or reaches a predefined limit. The server 160 is also configured to customize the notifications depending on a user and/or device profile. The server 160 is further configured to track the positions and statuses of the devices (e.g. the cell phones 120A to 120D, the televisions/STBs 130A and 130B, the laptop computer 150 and the tablet computers 140A-140B) in order to determine which device is currently present and active in the household 100 as part of a decision process to decide the devices which will receive the notifications as will be described in more detail with reference to FIGS. 4 and 5 below.

Figure 2:
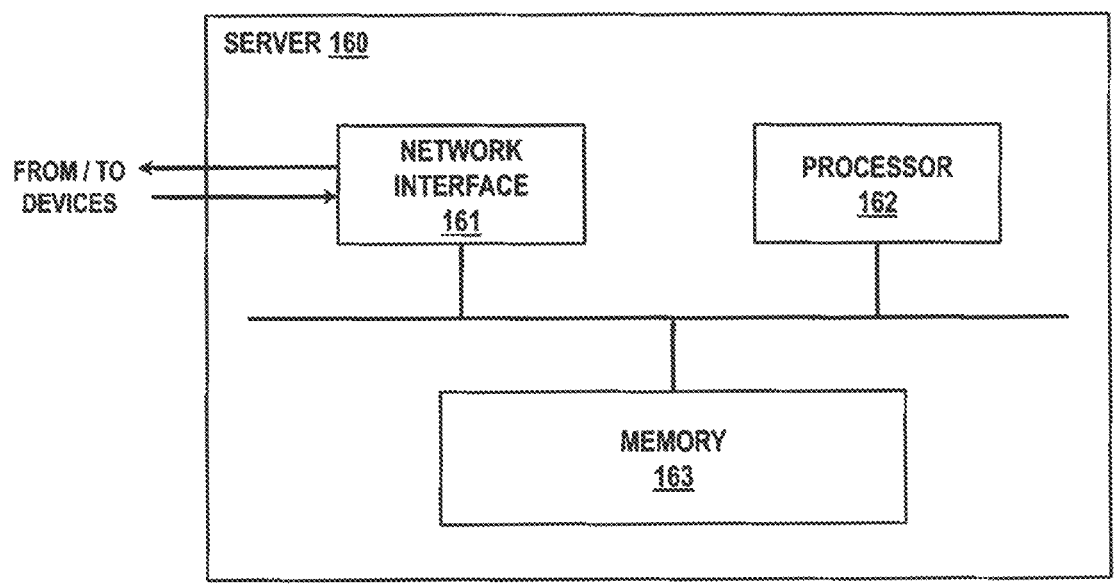
FIG. 2 is a simplified block diagram illustration of a server, constructed and operative in accordance with an embodiment of the present invention.

Reference is now made to FIG. 2, which is a block diagram illustration of a server, constructed and operative in accordance with an embodiment of the present invention. The server 160 typically comprises at least an input/output (I/O) network interface 161, a processor 162 and a memory 163.

The network interface 161 may be any suitable communication interface enabling the server 160 to exchange data with the sensors 110A to 110D and the devices 120A to 120D, 130A, 130B, 140A, 140B and 150. The I/O network interface 161 is further operable to pass the received data to the processor 162 and/or the memory 163.

The processor 162 is a microcontroller or a microprocessor, for example to execute software instructions stored in memory 163.

The memory 163 may comprise read only memory (ROM), random access memory (RAM), magnetic disk storage media devices, optical storage media devices, flash memory devices, electrical, optical, or other physical/tangible (e.g. non-transitory) memory storage devices. Thus, in general, memory 163 may comprise one or more computer readable storage media (e.g. memory device) encoded with software comprising computer executable instructions and when the software is executed (by the processor 162) it is operable to perform the operations described hereinbelow. For example, memory 163 stores or is encoded with instructions for determining:

- if a measure received from one of the sensors 110A to 110D is over a predefined threshold or reaches a predefined value;
- which devices 120A to 120D, 130A, 130B, 140A, 140B and 150 are currently present and turned on in the household 100; and
- which notification format(s) to use for display on the devices 120A to 120D, 130A, 130B, 140A, 140B and 150.

The memory 163 is further operable to store information/data including, but not limited to, one or more predefined thresholds for different measures/sensors 110A-110D, users profiles, devices profiles, notification formats including layouts and metadata (e.g. audio and/or video contents, pictures, textual information, etc.) used for generating and/or displaying the notifications, etc.

Users' profiles and devices profiles may be defined for the different members of the household 100 via a dedicated user interface displayed on one of the devices equipped with a display screen 120A to 120D, 130A, 130B, 140A, 140B and 150. To do so, one or more users may access the user interface using a remote controller, a keyboard, a mouse, etc. associated with one of the devices equipped with a display screen 120A to 120D, 130A, 130B, 140A, 140B and 150. A user profile may be defined for each household member and typically comprises: a user identifier (e.g. a name); a user type assigned to the user (e.g. parent, guardian, teenager, grade school child, pre-school child, etc.); a rank value for the user which is associated with the user type; and the device(s) associated with the user. The user type and/or the rank value are parameters typically defining an order of priority to use for determining which format to use for displaying a notification. Also, at least one notification format may be defined and/or associated with each particular user profile and/or user type.

Also, a device profile may be defined for each device of the household 100 which is capable of receiving and displaying the notifications and typically comprises at least: a device identifier (e.g. a name) and a type of device defining if the device is a shared device (e.g. a device shared between the different members of the household 100 and generally at a fixed location in the household 100) or a personal device (e.g. a mobile device belonging to a single member of the household 100). In addition, a device profile may include further parameters such as the current location of a personal device as well as at least one user profile associated with the personal device. The user profile(s) may comprise, for example, a first user profile corresponding to the owner of the personal device and a second user profile corresponding to a person to be notified (i.e. send an additional notification)

. Knowledge of the current location is typically useful for determining if it is relevant to send a notification to the personal device. Also, knowledge of the user profile(s) associated with the personal device is typically useful for determining the owner of the personal device and therefore which notification format to use for the personal device. When two or more users' profiles are associated with a personal device, the first user profile may correspond, for example, to the owner of the personal device (e.g. a child) while the second user profile may correspond to another member of the household 100 to whom a notification is to be sent. Knowledge of the second user profile associated with the personal device is typically useful in a situation where the child is alone at home. In this case, a first notification may be sent to the personal device of the child in a first notification format while a second notification may be sent to the personal device associated with the parent in a second notification format. Those skilled in the art will appreciate that these further parameters may not be provided for shared devices since the shared devices remain within the household 100 during their life time and are shared between the different household members. Alternatively, default values may be used for the current location (e.g. a fixed location within the household 100) and/or the at least one user profile associated with the shared device (e.g. set to 'ALL'). Examples of users and devices profiles of a particular household 100 will be provided and described in further details later in the present application with reference to FIG. 3.

When the processor 162 of the server 160 determines that a measure received from one of the sensors 110A to 110D is more than a predefined threshold or reaches a particular value, notifications are transmitted to one or more of the devices 120A to 120D, 130A, 130B, 140A, 140B and 150. In order to efficiently inform the users, the notifications are customized to be in a format suitable to be used/displayed on a particular device and understood by the user(s) of the particular device. To do so, a plurality of notification formats are provided and stored in memory 163. A notification format typically specifies how a notification is to be generated and/or displayed on a device for a particular user and/or user type defined in the users' profiles. At least one notification format is defined and/or associated with each particular user profile and/or user type so that any of the devices 120A to 120D, 130A, 130B, 140A, 140B and 150 (shared or personal) is able to display a notification at any time. Additionally and/or alternatively, alternate notification formats may be provided for a particular user and/or user type. Non-limiting examples of alternate notification formats may comprise:

a first notification format (including a first layout and additional content) and a second notification format (including a second layout and further content) may be provided for a same user type;
   a first notification format (including a first layout and additional content) and a second notification format (including a second layout and further content) may be provided for a same user;
   a first notification format (including a first layout and additional content) for a personal device and a second notification format (including a second layout and further content) for a shared device may be provided for a same user;
   a first notification format (including a first layout and additional content) for a first personal device and a second notification format (including a second layout and further content) for a second personal device may be provided for a same user;
   a first notification format (including a first layout and additional content) for a first shared device and a second notification format (including a second layout and further content) for a shared personal device may be provided for a same user and/or user type; etc.

Examples of user interfaces, showing different notification formats constructed and operative in accordance with embodiments of the present invention, will be provided and described in further details later in the present application with reference to FIGS. 6A, 6B, 7A to 7D, and 8A to 8E.

Reference is now made to FIG. 3, which is a block diagram illustration of users and devices profiles of a particular household, constructed and operative in accordance with an embodiment of the present invention.

The household 100 of FIG. 3 comprises five members and eight devices equipped with a display screen. Those skilled in the art will appreciate that this household configuration is provided for illustration purposes only and is not limiting. Five users' profiles are shown, each of them corresponding to a single household member: Tom's user profile 101, Angela's user profile 102, Foster's user profile 103, Emily's user profile 104 and Amy's user profile 105. Also, eight devices profiles are shown, each of them corresponding to one of the devices equipped with a display screen previously depicted in FIG. 1: Tom's cell phone 120A profile, Tom's tablet computer 140A profile, Angela's cell phone 120B profile, Foster's cell phone 120C profile, Emily's cell phone 120D profile, Amy's tablet computer 140B profile, and televisions and/or STBs 130A and 130B profiles.

Tom's user profile 101 typically comprises the following data: a name ("Tom") is used as the user identifier; the user type assigned to Tom is "parent"; the rank value is set to "1" thereby indicating that Tom's user profile has the highest priority; and two devices profiles, namely the cell phone 120A profile and the tablet computer 140A profile, are associated with Tom's user profile 101. Both the profiles of devices 120A and 140A include a name as a device identifier and are personal devices. Also, the current locations of the cell phone 120A and the tablet computer 140A are tracked and saved into their respective devices profiles. For example, the current location may be indicated by GPS (Global Positioning System) coordinates associated with the device. Additionally and/or alternatively, the current location may be a flag, a bit, or any other indication specifying whether or not the device is currently present in the household 100. Presence data may also be gathered by capturing and analyzing the beacons that every WiFi enabled device periodically emits when its WiFi antenna is turned on in order to detect the presence of nearby wireless networks. Presence distinguishes between devices and recognizes repeat visitors by collecting a MAC (Media Access Protocol) address, the unique identifier assigned to every device connecting to wired or wireless networks. Also, at least one notification format is defined and/or associated with Tom's user profile 101 or user type. For example, the Format(#1)-User_type(#Parent) may be associated with Tom's user profile 101.

Angela's user profile 102 typically comprises the same characteristics as the one described with reference to Tom's user profile 101. However, the rank value associated with Angela's user profile 102 is set to "2" thereby meaning that Angela's user profile 102 has a lower priority than Tom's user profile 101. Furthermore, only one personal device (i.e. the cell phone 120B) is associated with Angela's user profile 102. Also, at least one notification format is defined and/or associated with Angela's user profile 102 or user type. For example, the Format(#1)-User_type(#Parent) may be associated with Angela's user profile 102.

Foster's user profile 103, Emily's user profile 104 and Amy's user profile 105 are also shown on FIG. 3 and typically comprise the same characteristics as the one described hereinabove. However, Foster is assigned a "teenager" user type, Emily a "grade school" user type and Amy a "pre-school" user type. Also, different rank values are provided for these users profiles. Typically, Foster's user profile 103 has a higher priority than Emily's user profile 104 and Amy's user profile 105. Also, Emily's user profile 104 has a higher priority than Amy's user profile 105. Furthermore, different personal devices profiles are associated with these users' profiles: cell phone 120C is associated with Foster's user profile 103; cell phone 120D is associated with Emily's user profile 104; and tablet computer 140B is associated with Amy's user profile 105. Current locations of these personal devices are tracked and saved into their respective profiles. Also, at least one notification format is defined and/or associated with Foster's user profile 103 (e.g. Format(#2)-User_type(#Teenager)), Emily's user profile 104 (e.g. Format(#3)-User_type(#Grade_School)) and Amy's user profile 105 (e.g. Format(#4)-User_type(#Pre_School)).

FIG. 3 also shows two additional devices not associated with any of the users' profiles 101 to 105. These device profiles correspond to televisions and/or STBs 130A and 130B which are shared devices shared between the different members of the household 100. Device identifiers are also provided as the "Living Room TV" for device 130A and "Bedroom TV" for device 130B.

Different notification formats 106 may be used when generating and/or displaying the notifications on the different devices 120A to 120D, 130A-130B and 140A-140B and may be defined for this household 100. A first format (i.e. Format(#1)-User_type(#Parent)) is specified and typically used for personal devices associated with users' profiles whose user type is set to "parent". Therefore, in the configuration shown in FIG. 3, the notification format used for the cell phones 120A and 120B as well as for the tablet computer 140A is this first format. Similarly, Format(#2)-User_type(#Teenager) is used for cell phone 120C, Format (#3)-User_type(#Grade_School) is used for cell phone 120D and Format(#4)-User_type(#Pre_School) is used for tablet computer 140B.

Shared devices 130A and 130B may use one or more of the notification formats 106 to display the notifications. In one example embodiment of the present invention, the current locations of the different personal devices are used to determine which personal devices are present in the household 100. Then, the highest priority user profile (i.e. the most senior user type and/or the highest rank value) associated with the personal devices present in the household 100 is used to select the relevant notification format. For example, if it is determined that Tom and Foster are at home according to the current locations of Tom's cell phone 120A and Foster's cell phone 120C, the first format (i.e. Format(#1)-User_type(#Parent)) is selected among the different notification formats 106 as the highest priority user profile and used by the television 130A to display the notifications since Tom's user type (i.e. "parent") is more senior than Foster's user type (i.e. "teenager") and/or since Tom's rank (i.e. "1") is higher than Foster's rank (i.e. "3").

Figure 4:
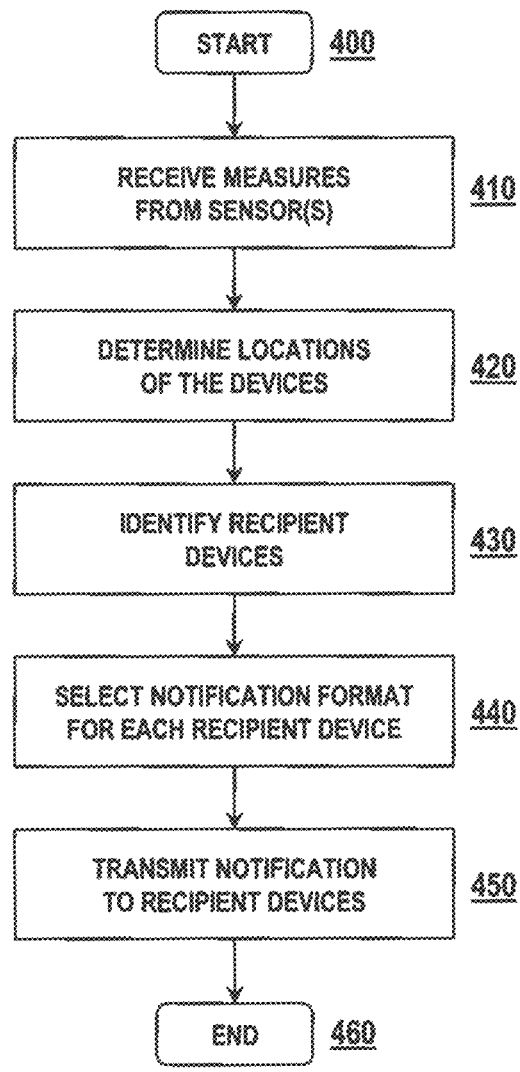
FIG. 4 is a simplified flow chart diagram illustrating a method for generating and/or transmitting a notification in accordance with an embodiment of the present invention.

Reference is now made to FIG. 4, which is a flow chart diagram illustrating methods for generating and/or transmitting an notification according to an embodiment of the present invention. The process starts at step 400.

At step 410, the server 160 receives different measures from different sensors 110A to 110D. Non-limiting examples of environmental measures received from the sensors 110A to 110D includes: carbon monoxide or dioxide levels; dust levels in the different rooms of the household 100; pollen levels; allergen levels; heart rate levels; blood pressure levels; etc. The processor 162 of the server 160 is then operable to determine if a notification is to be sent to the different members of the household 100. This determination may be achieved by comparing the received measures to predefined thresholds and/or values stored in memory 163. When the processor 162 determines that a measure is over a predefined threshold and/or reaches a predefined value, a notification generation and distribution to the household members is triggered. Additionally and/or alternatively, the sensors 110A to 110D may be configured to transmit the measure to the server 160 only in a situation where the measure is over a pre-defined threshold and/or reaches a predefined value. Typically, the sensors 110A to 110D may have some processing capabilities in order to determine whether or not the measure is over a predefined threshold and/or reaches a particular value and needs to be transmitted to the server 160. In such a situation, the server 160 receives the measure and is configured to generate and/or send a notification to the household members.

Then, the process moves to step 420. The processor 162 determines the location of the different devices 120A to 120D, 130A, 130B, 140A, 140B and 150. The current location is typically retrieved using the current location parameter indicated in the different devices profiles. The current location determination may also be performed at this time so that the most up-to-date current location of the different devices is used. Alternatively, the processor 162 may be configured to determine the current location of the personal devices 120A to 120D, 140A, 140B and 150 only. Indeed, in general this determination is not relevant for shared devices since the shared devices 130A and 130B are assumed to be present in the household 100 at all times and/or the current location parameter may not be provided.

At step 430, the server 160 identifies to which recipient devices 120A to 120D, 130A, 130B, 140A, 140B and 150 a notification is to be transmitted. The recipient devices typically comprise the devices 120A to 120D, 130A, 130B, 140A, 140B and 150 present in the household 100 which are currently turned on so that an notification can be transmitted and displayed in a timely manner. This may be achieved, for example, but not limited to, by determining whether or not: a device is currently communicating (wirelessly or not) with the server 160 acting as a home gateway or access point; the display screens of the televisions 130A and 130B are turned on by pinging them or receiving signals back from them; the STBs 130A and 130B are turned on by pinging them or monitoring their activity; etc. As a result, the processor 162 knows which devices are present in the household 100 and operable to receive a notification. Additionally, user profiles associated with the devices present in the household 100 and operable to receive a notification are identified. Consequently, at the end of step 430, the server 160 knows to which recipient devices a notification is to be transmitted.

The process then moves to step 440 in which a relevant notification format is selected for each recipient device of step 430. A relevant format is typically determined using the user profiles associated with the recipient devices. The relevant notification formats, including corresponding layouts and additional content, are retrieved from memory 163.

The processor 162 may further be configured to generate the notifications using the layouts and additional content and send them at step 450 to the selected recipient devices. Alternatively, the processor 162 may be configured to transmit, at step 450, each identified notification format (including a layout and additional content) to a relevant recipient device. In the latter case, the notification formats are received by the different recipient devices and the notifications are generated locally. In both cases, the notifications are finally displayed on the display screens of the recipient devices (120A to 120D, 130A, 130B, 140A, 140B and 150).

The process ends at step 460.

Figure 5:
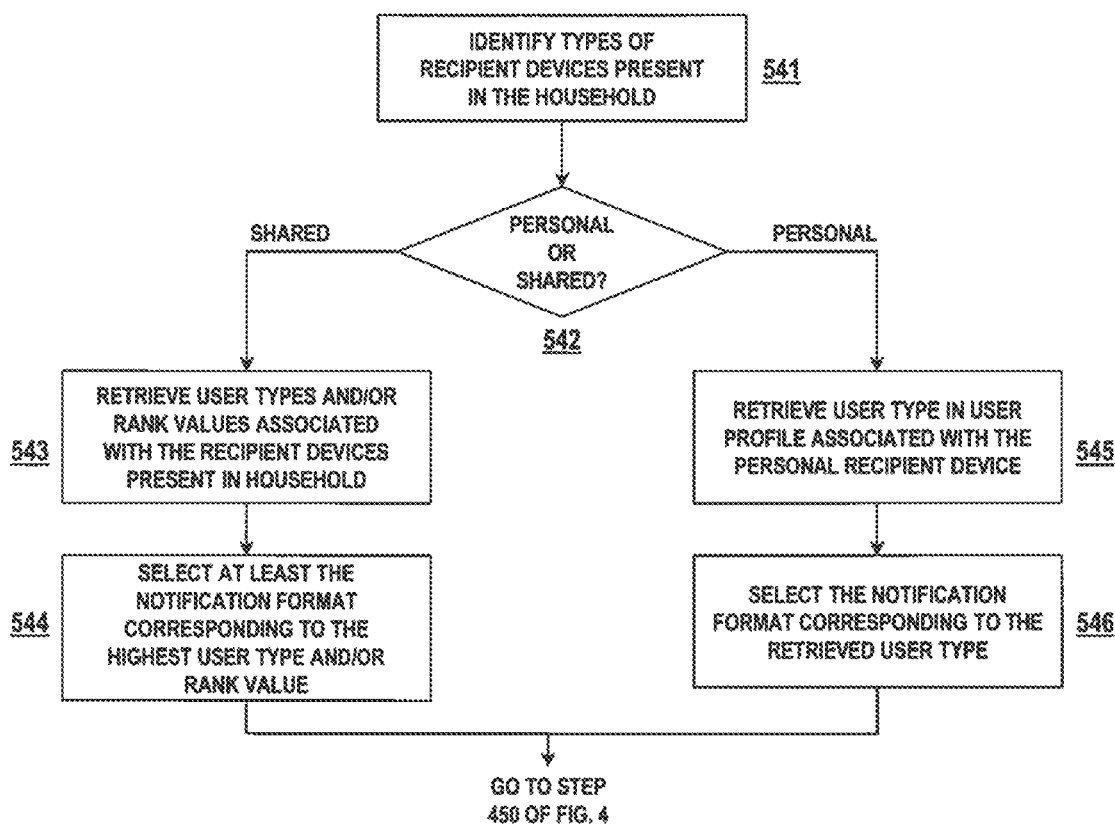
FIG. 5 is a simplified flow chart diagram illustrating methods for selecting notification formats to use for different recipient devices in accordance with an embodiment of the present invention.

Reference is now made to FIG. 5, which is a flow chart diagram illustrating methods for selecting notification formats to use for different recipient devices in accordance to an embodiment of the present invention.

At step 430 of FIG. 4, the recipient devices to which a notification is to be transmitted are identified. The process moves then to step 440 in which a relevant notification format is determined for each recipient device. Further details on how the determination of step 440 is performed are now described with reference to FIG. 5. This process is performed for each recipient device identified as being present in the household 100 and turned on.

The process starts at step 541 in which the processor 162 determines the type of the recipient device using the device's profile.

If the recipient device is a shared device such as, for example, the television/STB 130A, the process proceeds with step 542 and step 543. At step 543, the processor 162 retrieves the user types and/or the rank values of all users' profiles associated with the recipient devices present in the household 100 (determined in step 430 of FIG. 4) from memory 163.

Then, the process moves to step 544 where the processor 162 sorts the from a highest to a lowest priority user profile using the user types and/or rank values and selects at least the notification format corresponding to the highest priority user profile. Typically, the notification format corresponding to the most senior user type and/or the highest rank value is selected to generate and/or transmit the notification. Using either the user type or the rank may be enough to determine the relevant notification format to use. However, in a situation where two same user types are retrieved, it is useful to further use the rank values to select the relevant notification format. Also, for shared devices, more than one notification may be displayed. For example, two notifications having different notification formats may be displayed at the same time. In such a case, the processor 162 may use the notification format corresponding to the highest priority (e.g. most senior user type and/or highest rank) to display a first notification while a second notification may be displayed using any other notification format corresponding to another user type and/or lowest rank value.

If the recipient device is a personal device (step 542), the process goes to step 545. At step 545, the processor 162 retrieves the user type of the user profile associated with the recipient device from memory 163. Then, at step 546, the notification format corresponding to the retrieved user type is selected to generate and/or transmit the notification. For example, if the recipient device is Tom's cell phone 120A, the processor 162 determines that Tom's user type is set to "parent" and selects the "parent" notification format (i.e. first format Format(#1)-User_type(#Parent)) to generate and/or transmit the notification. Similarly, if the recipient device is Amy's tablet computer 140B, the processor 162 determines that Amy's user type is set to "pre-school" and selects the "pre-school" notification format (i.e. Format(#1)-User_type(#Pre-School)) for the notification.

Two examples are now provided to further illustrate the methods described on FIGS. 4 and 5. In these examples, the household configuration is the one shown in FIG. 3. Those skilled in the art will appreciate that these two examples and the particular household configuration are given for illustration purposes only and are not limiting.

In the first example, the sensor 110A is a sensor configured to monitor the dust levels in Foster's room. Angela, Foster and Emily are at home whereas Tom and Amy are away. Furthermore, the following devices are turned off: Tom's tablet computer 140A; Amy's tablet computer 140B; and television/STB 130B. At step 410, the server 160 receives from sensor 110A the measure of the dust levels in Foster's room and determines that it is over a predefined threshold. Therefore, a notification indicating this threat is to be sent to the different users. At step 420, the processor 162 retrieves the current locations and statuses of the different devices and then, identifies (step 430) the following recipient devices (i.e. that a notification may be sent to): Angela's cell phone 120B; Foster's cell phone 120C; Emily's cell phone 120D; and television/STB 130A. Also, the processor 162 may identify that one additional user's profile (i.e. Tom's user profile 101) is associated with Foster's cell phone 120B and therefore, Tom's cell phone 120A may be added to the recipient devices. Adding Tom's cell phone 120A to the recipient devices may depend on further parameter or implementation choices. For example, the processor 162 may decide not to add Tom's cell phone 120A to the recipient devices in a situation where: a similar user type is identified as being present in the household 100; or a certain rank value is identified as being present in the household 100; or a risk associated with the received measure is low; etc. In the current example, Tom's cell phone 120A is not added to the recipient device. The process moves to step 440 and the processor 162 selects the different notification formats to use for the cells phones 120B-120D and the television/STB 130A. To do so, the processor 162 first identifies the type of device corresponding to Angela's cell phone 120B and determines that this is a personal device (step 542). It is further determined that Angela's user type is set to "parent" (step 545) and therefore, the "parent" notification format may be selected to display the notification on Angela's cell phone 120B. These steps are repeated for the two other cell phones 120C and 120D. As a result, the notification may be displayed in "teenager" format on Foster's cell phone 120C and in "grade school" format on Emily's cell phone 120D. For the television/STB 130A, the processor 162 determines that it is a shared device at step 542 and therefore moves to step 543. At this step, the user types and rank values corresponding to Angela's, Foster's and Emily's users' profiles are retrieved and sorted. The processor 162 determines that the highest priority user profile (i.e. most senior user type and/or highest rank) is Angela's user profile which is set to "parent"/"2". As a result, the notification may be displayed on the television/STB 130A using the "parent" notification format. Additionally, another notification using another notification format (e.g. in "teenager" notification format) may be displayed on the television/STB 130A.

In the second example, the sensor 110B is a sensor configured to monitor the carbon monoxide level in the kitchen. Angela and Foster are at home whereas Tom, Emily and Amy are away. Furthermore, the following devices are turned off: Tom's tablet computer 140A; Amy's tablet computer 140B; and television/STB 130B. At step 410, the server 160 receives from sensor 110A the measure of the carbon monoxide level in the kitchen and determines that it is over a pre-defined threshold. Therefore, a notification indicating this measure is to be sent to the different users. At step 420, the processor 162 retrieves the current locations and statuses of the different devices and then, identifies (step 430) the following recipient devices (i.e. that a notification may be sent to): Angela's cell phone 120B; Foster's cell phone 120C; and television/STB 130A. Also, the processor 162 identifies that one additional user's profile (i.e. Tom's user profile 101) is associated with Foster's cell phone 120B and therefore, Tom's cell phone 120A is added to the recipient devices. The process moves to step 440 and the processor 162 selects the different notification formats to use for the cells phones 120A-120C and the television/STB 130A. For Tom's cell phone 120A, the processor 162 uses Tom's user profile and determines that the user type is set to "parent". Therefore, the "parent" notification format is selected for displaying the notification on Tom's cell phone 120A. For the recipient devices present in the household 100, the processor 162 first identifies the type of device corresponding to Angela's cell phone 120B and determines that this is a personal device (step 542). It is further determined that Angela's user type is set to "parent" (step 545) and therefore, the "parent" notification format may be selected to display the notification on Angela's cell phone 120B. These steps are repeated for Foster's cell phone 120C. As a result, the notification may be displayed in "teenager" format on Foster's cell phone 120C. For the television/STB 130A, the processor 162 determines that it is a shared device at step 542 and therefore moves to step 543. At this step, the user types and/or rank values corresponding to Angela's and Foster's user profiles are retrieved, and sorted. The processor 162 determines that the highest priority user profile (i.e. the most senior user type and/or highest rank) is Angela's user profile which is set to "parent"/"2". As a result, the notification may be displayed on the television/STB 130A using the "parent" notification format. Additionally and/or alternatively, another notification using another notification format (e.g. in "teenager" notification format) may be displayed on the television/STB 130A.

Reference is now made to FIGS. 6A, 6B, 7A, 7B, 7C, 8A, 8B and 8C, which are pictorial illustrations showing different notification formats in accordance with embodiments of the present invention.

Figure 6B:
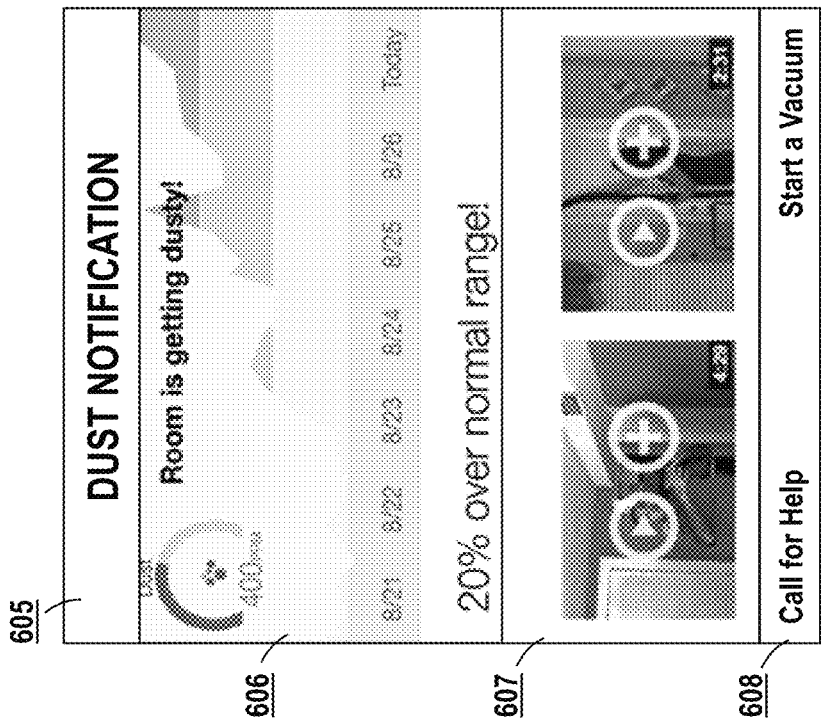
FIGS. 6A and 6B are simplified pictorial illustrations showing different notification formats in accordance with embodiments of the present invention.
Figure 6A:
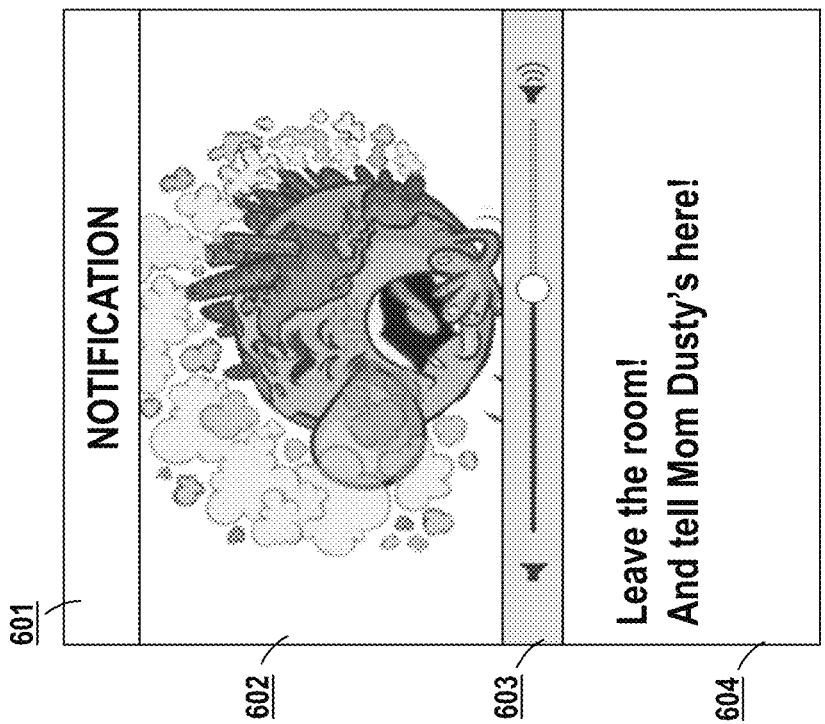

FIGS. 6A and 6B show two notification formats corresponding to a notification displayed when a sensor detects a high dust level. FIG. 6A shows a notification displayed onto Amy's tablet computer 140B. The notification is typically customized to be understandable by Amy (pre-school child). The notification format typically comprises a layout suitable for display on a tablet computer and additional content adapted to the cognitive abilities of a pre-school child. This notification format typically comprises: a first section 601 including textual information indicating that the display corresponds to a notification; a second section 602 including a visual indication (e.g. cartoon picture) illustrating the type of notification; a third section 603 including an audio indication (e.g. audio message) explaining and/or giving instructions relevant to the notification; and a fourth section 604 including textual information (e.g. written instructions). Those skilled in the art will appreciate that the present invention in embodiments thereof is not limited by what is shown. On the contrary, the sections 602 and 603 may be associated for instance to provide audio video data describing the notification and/or giving instructions to the end user. Similarly, sections 603 and 604 may be associated with audio and textual information and/or instructions to the end user. FIG. 6B shows the same notification being displayed onto Tom's cell phone 120A. The notification format typically comprises a layout suitable for display on a cell phone and additional content adapted to the cognitive abilities of a parent. This notification format typically comprises: a first section 605 specifying the type of notification; a dashboard 606 giving a visual representation of the received measure; a video section 607 comprising links to websites and/or embedded videos explaining how to fix the problem; and another section 608 with textual information. This section may also include a link for calling someone for assistance and/or tips giving instructions to fix the problem.

Figure 7B:
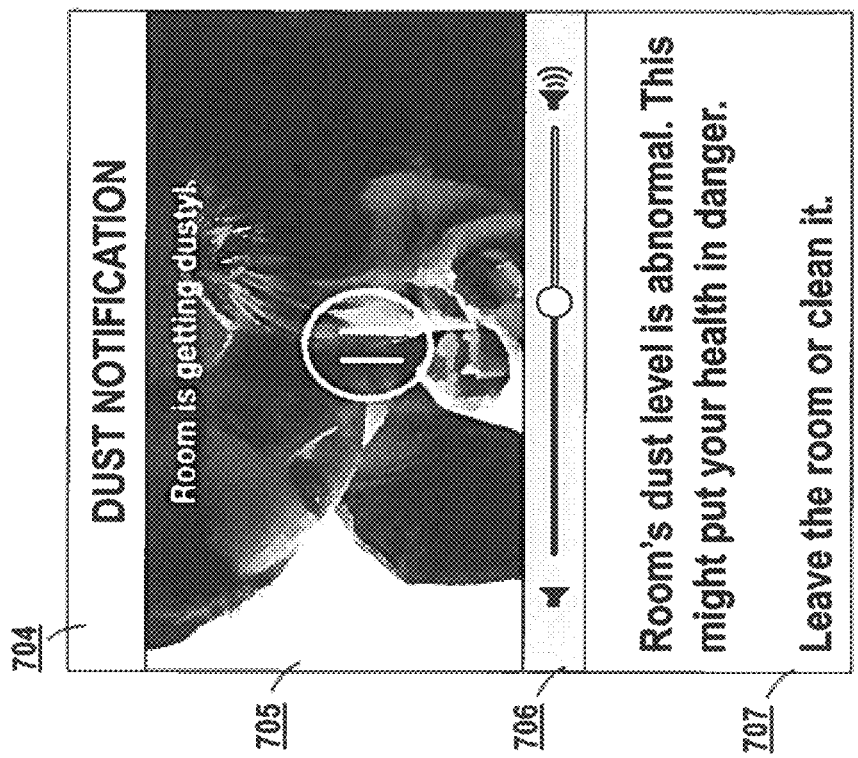
FIGS. 7A, 7B and 7C are simplified pictorial illustrations showing different notification formats in accordance with other embodiments of the present invention.
Figure 7A:
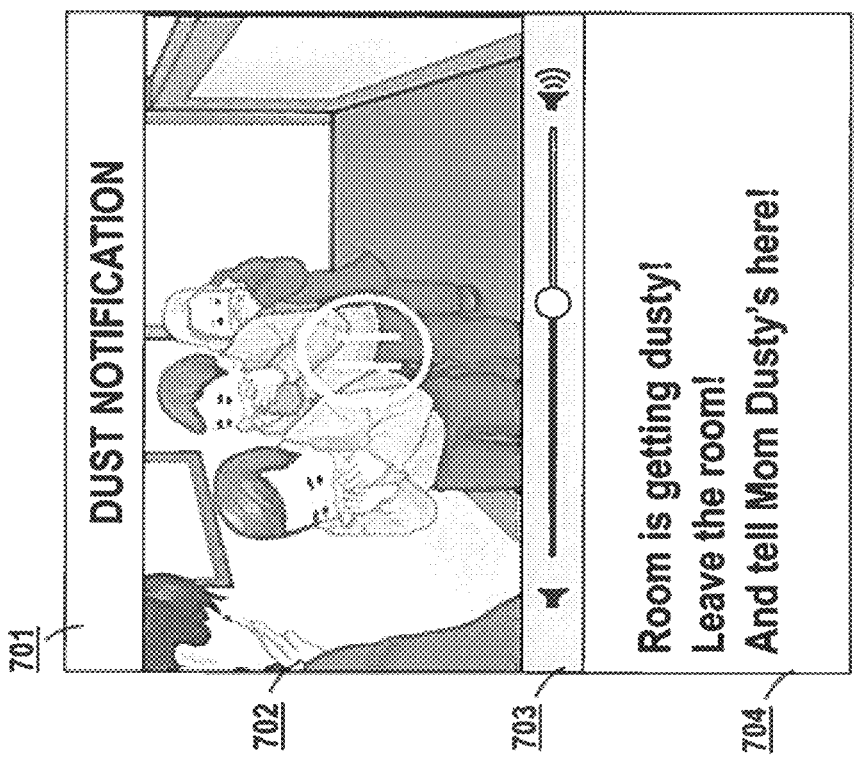
Figure 7C:
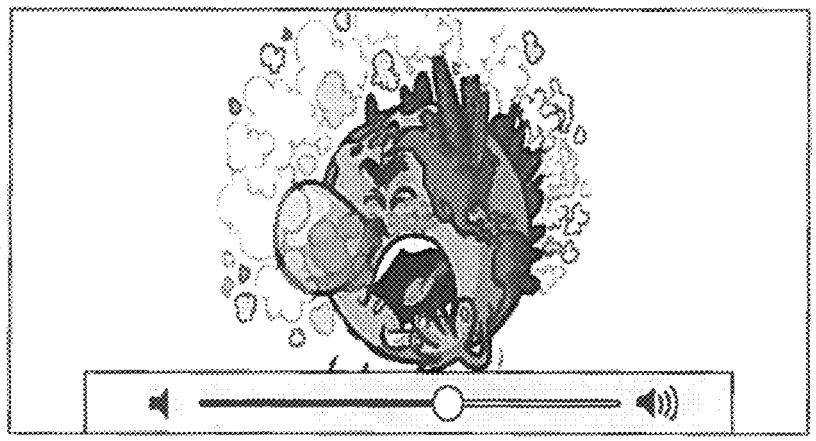

FIGS. 7A to 7C show different notification formats displayed on different devices for the notification discussed with reference to FIGS. 6A and 6B. FIG. 7A represents a notification format adapted to the cognitive capabilities of a grade school child (e.g. Emily). Similarly, FIG. 7B shows a teenager notification format that may be used for display on Foster's cell phone 120B. The notification formats are similar to the one shown in FIG. 6A for Amy. The content of sections 702 and 705 are different from the content of section 602 and now include a video (instead of a cartoon picture) explaining to the grade school child and/or the teenager how to behave in response to the notification. Finally, FIG. 7C shows the same notification being displayed on a television (e.g. television/STB 130A) using Amy's pre-school child notification format.

Figure 8A:
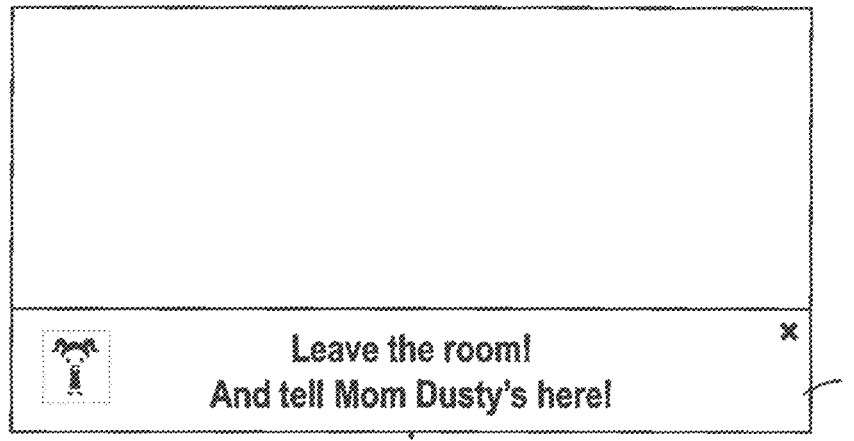
FIGS. 8A, 8B, 8C, 8D and 8E are simplified pictorial illustrations showing different notification formats in accordance with further embodiments of the present invention.
Figure 8B:
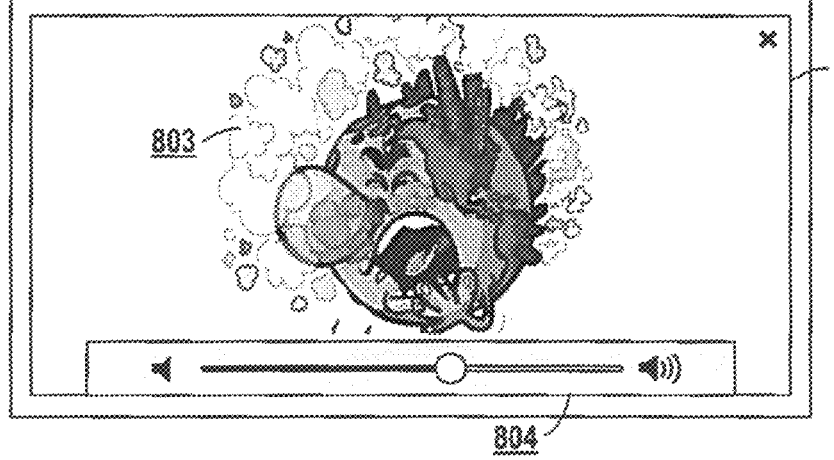
Figure 8C:
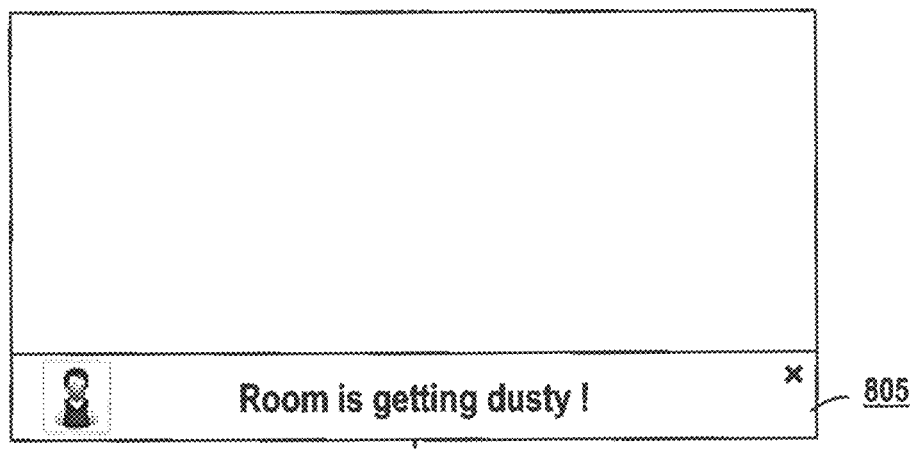
Figure 8D:
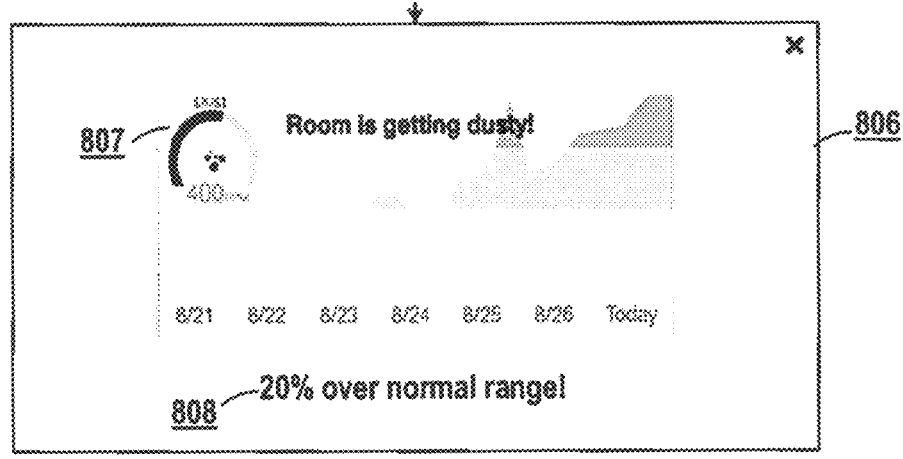
Figure 8E:
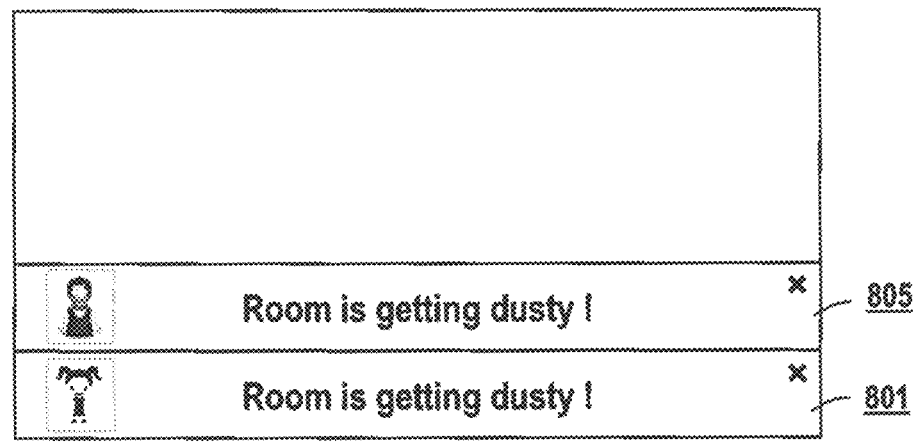

FIGS. 8A to 8E show different ways of displaying the notifications on a television screen (e.g. television/STB 130A). FIGS. 8A and 8C show the same notification using different notification formats. Typically, the pre-school notification format is used for displaying the notification in FIG. 8A while the parent notification format is used for displaying the notification in FIG. 8C. In both cases, the notification format comprises a layout suitable to be used on a television screen. The notification may be displayed as a banner 801/805, including textual information, at the bottom of the television screen so that the user may still view the programming content in the background. Other types of visual and/or audio indications such as, for example, but not limited to, a pop-up message, a user interface notification, an on-screen display, etc. may be used to display the notification while still enabling the user to view the television programming content in the background. The user may select the banner 801/805 using a television remote control and access more information about the notification. In response to the user's selection, a second layout 802/806 may be displayed showing additional information (e.g. a cartoon picture 803 and audio information 804 for FIG. 8B and a dashboard 807 including textual information 808 in FIG. 8D). In another example, the second layout 802 of FIG. 8B (respectively 806 of FIG. 8C) may be displayed automatically a few seconds after the display of the banner 801 of FIG. 8A (respectively banner 805 of FIG. 8D). FIGS. 8C and 8D illustrate the same mechanisms as the ones described for FIGS. 8A and 8B but using a parent notification format instead of the pre-school notification format. As explained in relation to FIG. 5, such a notification may be displayed after having determined that the parent notification format is to be used (steps 541 to 544 of FIG. 5) because Tom's user type is the most senior and/or Tom's rank is higher than Amy's rank. FIG. 8E illustrates the situation where more than one notification format is used to display the notification. A first parent notification format (i.e. corresponding to the highest priority user profile i.e. the most senior user type and/or the highest rank) may be used to display a first notification 805 while a second pre-school notification format (i.e. corresponding to a less senior user type and/or a lowest rank) may be used to display a second notification 801.

Although the above embodiments have been described in the context of a particular household configuration (including a particular set of devices, household members, notification formats, etc.), someone skilled in the art will realize that other implementations are possible.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method comprising:
   determining that a notification is to be transmitted to at least one shared device of a household, said shared device comprising a display screen and being shared by a plurality of members of said household;
   identifying a plurality of personal devices currently located in said household and turned on;
   retrieving a user profile associated with each of said identified plurality of personal devices currently located in said household and turned on, each user profile defining a notification format to use for one of said identified plurality of personal devices and comprising at least one parameter to use for determining a highest priority user profile;
   selecting a first notification format to use for a first notification, said selected first notification format corresponding to the highest priority user profile associated with a personal device from said identified plurality of personal devices currently located in said household and turned on;
   selecting a second notification format to use for a second notification, said second notification format corresponding to a user profile other than the highest priority user profile; and
   transmitting said first notification in said selected first notification format corresponding to the highest priority user profile and said second notification in said selected second notification format corresponding to a user profile other than the highest priority user profile to said at least one shared device for displaying, at the same time, said first notification in said selected first notification format and said second notification in said selected second notification format.

2. The method of claim 1, further comprising sorting said retrieved user profiles using said at least one parameter, said user profiles being sorted from a highest to a lowest priority user profile.

3. The method of claim 2, wherein said at least one parameter is a user type associated with a user profile.

4. The method of claim 2, wherein said at least one parameter is a rank value associated with a user profile.

5. The method of claim 2, wherein said transmitting further comprises transmitting said first notification in a relevant notification format to at least one of said identified plurality of personal devices for display, said relevant notification format being defined in a user profile associated with said at least one identified plurality of personal devices.

6. The method of claim 1, wherein said transmitting comprises:
   retrieving a layout and additional content corresponding to said selected first notification format from memory;
   generating said first notification using said retrieved layout and additional content; and
   transmitting said generated first notification to said at least one shared device for display.

7. The method of claim 1, wherein said transmitting comprises:
   retrieving a layout and additional content corresponding to said selected first notification format from memory; and
   transmitting said retrieved layout and additional content to said at least one shared device for generation of said first notification and display.

8. A device comprising:
   a processor operable to:
      determine that a notification is to be transmitted to at least one shared device of a household, said shared device comprising a display screen and being shared by a plurality of members of said household;
      identify a plurality of personal devices currently located in said household and turned on; and
      retrieve a user profile associated with each of said identified plurality of personal devices currently located in said household and turned on, each user profile defining a notification format to use for one of said identified plurality of personal devices and comprising at least one parameter to use for determining a highest priority user profile;
      select a first notification format to use for a first notification, said selected first notification format corresponding to the highest priority user profile associated with a personal device from said identified plurality of personal devices currently located in said household and turned on;
      select a second notification format to use for a second notification, said second notification format corresponding to a user profile other than the highest priority user profile; and
   a network interface operable to transmit said fir notification in said selected first notification format to the highest priority user profile and said second notification in said selected second notification format corresponding to a user profile other than the highest priority user profile to said at least one shared device for displaying, at the same time, said first notification in said selected first notification format and said second notification in said selected second notification format.

9. The device of claim 8, wherein said processor is further operable to sort said retrieved user profiles using said at least one parameter, said user profiles being sorted from a highest to a lowest priority user profile.

10. The device of claim 8, wherein said network interface is further operable to transmit said first notification in a relevant notification format to at least one of said identified plurality of personal devices for display, said relevant notification format being defined in a user profile associated with said at least one identified plurality of personal devices.

11. The device of claim 8, wherein said network interface is further operable to receive one or more measures monitored by one or more external devices, and said processor is further operable to determine that a notification is to be transmitted to at least one shared device of said household when said received one or more measures are over a predefined threshold or reach a particular value.

12. The device of claim 8, wherein said device is an "Internet of Things" (IoT) server configured to communicate with one or more external IoT devices over an IoT network.

13. The device of claim 8, wherein said device further comprises a memory operable to store a layout and additional content for each notification format; and said processor is operable to retrieve a layout and additional content corresponding to said selected first notification format, and to generate said first notification using said retrieved layout and additional content; and said network interface is operable to transmit said generated first notification to said at least one shared device for display.

14. The device of claim 8, wherein said device further comprises a memory operable to store a layout and additional content for each notification format; said processor is operable to retrieve a layout and additional content corresponding to said selected first notification format; and said network interface is operable to transmit said retrieved layout and additional content to said at least one shared device for generation of said first notification and display.

15. One or more computer readable non-transitory tangible storage media encoded with software comprising computer executable instructions and when the software is executed the software is operable to:

determine that a notification is to be transmitted to at least one shared device of a household, said shared device comprising a display screen and being shared by a plurality of members of said household;

identify a plurality of personal devices currently located in said household and turned on;

retrieve a user profile associated with each of said identified plurality of personal devices currently located in said household and turned on, each user profile defining a notification format to use for one of said identified plurality of personal devices and comprising at least one parameter to use for determining a highest priority user profile;

select a first notification format to use for said first notification, said selected first notification format corresponding to the highest priority user profile associated with a personal device from said identified plurality of personal devices currently located in said household and turned on;

select a second notification format to use for a second notification, said second notification format corresponding to a user profile other than the highest priority user profile; and transmit said first notification in said selected first notification format to the highest priority user profile and said second notification in said selected second notification format corresponding to a user profile other than the highest priority user profile to said at least one shared device for displaying, at the same time, said first notification in said selected first notification format and said second notification in said selected second notification format.

* * * * *

UNITED STATES PATENT AND TRADEMARK OFFICE
CERTIFICATE OF CORRECTION

| | | |
|---|---|---|
| PATENT NO. | : 9,807,173 B2 | Page 1 of 1 |
| APPLICATION NO. | : 14/669007 | |
| DATED | : October 31, 2017 | |
| INVENTOR(S) | : Mark Shurtleff et al. | |

It is certified that error appears in the above-identified patent and that said Letters Patent is hereby corrected as shown below:

In the Claims

Column 14, Line 44, in Claim 8, "fir" to read as --first--.

Signed and Sealed this
Fifth Day of December, 2017

Joseph Matal
*Performing the Functions and Duties of the
Under Secretary of Commerce for Intellectual Property and
Director of the United States Patent and Trademark Office*